UNITED STATES PATENT OFFICE.

TONY PETITJEAN, OF TOTTENHAM COURT ROAD, ENGLAND.

IMPROVEMENT IN PROCESSES FOR SILVERING MIRRORS.

Specification forming part of Letters Patent No. 15,950, dated October 21, 1856.

*To all whom it may concern:*

Be it known that I, TONY PETITJEAN, of Tottenham Court Road, in the county of Middlesex, England, chemist, have invented certain Improvements in Silvering Glass; and I do hereby declare that the following is a full, clear, and exact description of the principle or character which distinguishes them from all other things before known, and of the usual manner of making, modifying, and using the same—that is to say:

My invention consists in the employment, as hereinafter described, of tartaric acid with ammoniacal nitrate of silver for the purpose of silvering glass.

To carry out the invention I first prepare two solutions of silver. Solution No. 1 is formed by combining four chemical equivalents of ammoniacal nitrate of silver with one equivalent of tartaric acid and a suitable quantity of distilled water. To ten and a half ounces of nitrate of silver I add six and a half ounces of liquid ammonia. I pour the ammonia upon the nitrate of silver, the combination of the two being attended with a disengagement of heat. I stir the mixture until the combination of the two is complete, and then stand it by for several hours, after which crystals of ammoniacal nitrate of silver are formed. I then add to the solution two pints and a half of distilled water, and stir the whole well in order to assist the crystals to dissolve. I then filter the solution in order to separate from it a small quantity of black powder, which is formed during the combination of the nitrate of silver and the ammonia, and add to the filtered liquid one and one-sixth ounce of tartaric acid dissolved in four times that weight of distilled water, repeating the stirring, as before. I subsequently add six quarts of distilled water, stir the whole well, and then leave it to stand for decanting. Upon the precipitate of tartrate of silver which is left after the decanting has taken place I pour from seven to eight quarts of distilled water in order to dissolve as much as possible of it, and stir and leave it to stand for a sufficient time, after which I decant the liquor and mix it with the first solution. I thus obtain about fifteen quarts of a solution of silver, to which I add two quarts of distilled water in order to make it perfectly limpid. The solution is then quite ready for use. What remains of the precipitate of tartrate of silver after the liquor is the second time decanted from it is dissolved by means of a few drops of nitric acid and laid aside. Solution No. 2 is formed by combining two chemical equivalents of ammoniacal nitrate of silver with one equivalent of tartaric acid and a suitable quantity of distilled water. All the manipulations gone through in the preparation of this solution are the same as in the case of solution No. 1, the only difference between the two solutions being that the quantity of tartaric acid in No. 2 is double that in No. 1. I should here observe that these solutions should be prepared for one day's use only.

The glass to be silvered should be well cleaned before it is operated upon. For this purpose I take a little of the solution No. 1 and dip slightly into it a piece of cotton, and add to the moistened cotton a little putty-powder, and then rub it very carefully all over the surface of the glass, which is afterward allowed to dry. I then take a second piece of cotton, perfectly clean and dry, and, placing upon it a little dry putty-powder, rub it very carefully and slowly over every part of the surface of the glass, moving it in straight lines as nearly parallel as possible. After this I dust the glass with a badger-brush in order to remove any fragments of powder that may remain upon it. I then take (for looking-glasses only) a roller formed of iron or wood and covered with india-rubber, perfectly cleaned, and after wetting the india-rubber with No. 1 solution rub it quickly over the glass, occasionally turning the roller a little round as the rubbing is proceeded with. I then lay the glass upon a suitable apparatus heated to about 150° Fahrenheit, and pour upon it No. 1 solution until all the surface of the glass is covered with the liquid. In about fifteen or twenty minutes a thin coating of silver is seen to be deposited all over the surface of the glass, and I then pour upon it as much of No. 2 solution as the surface can retain. (The surface will retain about half a pint of the liquid on each square foot of it.) I then leave the glass with the liquid upon it for about fifteen minutes, (or twenty minutes at most,) in which time the coating of silver is so much increased in thickness by a deposit from the second solution that it becomes opaque. (One pennyweight of silver is thus deposited upon every square foot of the surface of the glass.) After removing from it the excess of the solution I now take the glass, and, after well washing the coating of silver with warm water in order to cleanse the surface from any remains of the solution, I dry it and coat the silver surface with quickly-drying oil-color or brown varnish. In this manner I obtain a looking-glass incomparably finer, lighter, and more solidly coated than those made by the common process, and that, too, without in any way injuring the health of the operator.

Glasses which are of such shapes that they cannot be cleaned by the process hereinbefore described—such as smelling-bottles, for example—are first plunged into a strong solution of hyposulphite of soda and left to lie in it for ten or twelve hours. They are then washed several times and filled with solutions No. 1 and No. 2, successively. I do not necessarily require to heat the glass, as the deposition from the solutions takes place at either high or low temperatures; but the rapidity of the action increases with an increase of heat, and vice versa.

What I claim as my invention, and desire to secure by Letters Patent, is—

The employment of tartaric acid with ammoniacal nitrate of silver in any manner, substantially as described, for the silvering of glass.

In witness whereof I, the said TONY PETITJEAN, have hereunto set my hand this 5th day of July, 1856.

T. PETITJEAN.

Witnesses:
CLAUDIUS RUY,
RUY CADET.